R. P. Bailey.
Dressing Stone.
No. 4,057. Reissued Jul. 5, 1870.
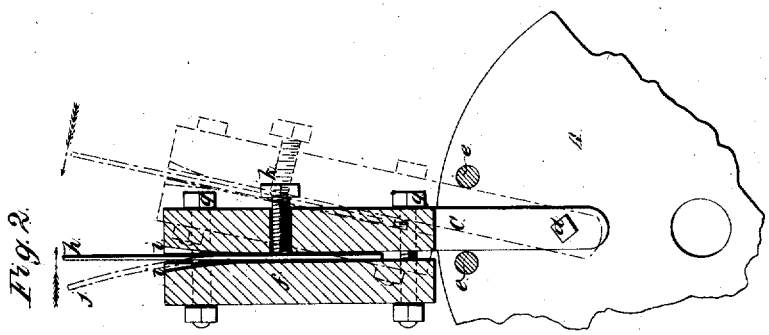
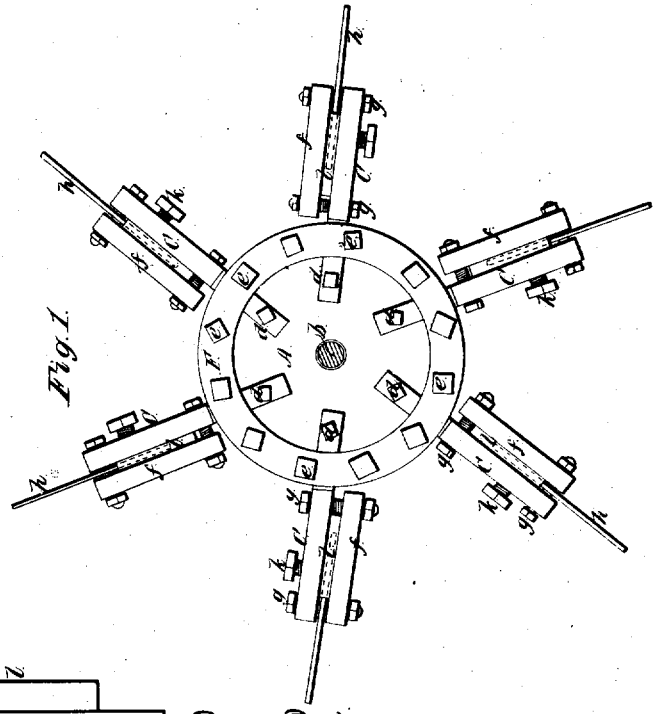
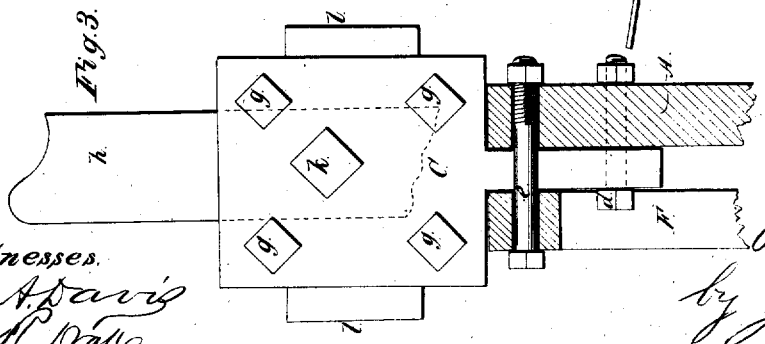
Witnesses.
J. A. Davis
J. C. Drake
Inventor
R. P. Bailey
by J. Fraser & Co.
Attys.
N. PETERS, PHOTO-LITHOGRAPHER, WASHINGTON, D. C.

United States Patent Office.

RALPH P. BAILEY, FOR HIMSELF, AND PLATT D. BABBITT, ASSIGNEE OF RALPH P. BAILEY, OF NIAGARA FALLS, NEW YORK.

*Letters Patent No.* 65,990, *dated June* 25, 1867; *reissue No.* 4,057, *dated July* 5, 1870.

IMPROVED MACHINE FOR DRESSING MARBLE.

The Schedule referred to in these Letters Patent and making part of the same.

*To all whom it may concern:*

Be it known that RALPH P. BAILEY, of Niagara Falls, in the county of Niagara and State of New York, invented certain Improvements in Machines for Working, Dressing, and Ornamenting Marble, Stone, Slate, and other similar substances, of which the following is a specification.

Stone-dressing machines have been generally constructed with a series of hammers or chisels, which reduce the surface to be dressed by repeated blows struck by the same, imitating, to a certain extent, the method of dressing by hand.

These machines leave the surface comparatively rough, which renders them unfit for the finer kinds of work, and especially for dressing marble, where a smooth polished surface is required. They are also objectionable on account of the liability of the striking hammers or chisels to chip out portions of the marble below the dressing-line, which requires the whole surface to be dressed away to the depth of the chipped-out depression or cavity, thereby involving a waste, both of labor and material.

The object of these improvements is to avoid these difficulties and defects, by the construction of a machine, which, by operating on a different principle, will not only produce a smooth surface, but enable grooves to be readily cut, and moldings formed with great ease and facility, whereby a considerable amount of material is saved, and the greater portion of the labor which is usually required to smooth and polish a surface after it has been dressed by the ordinary machines, is saved.

This invention consists—

First, of a spring-blade or scraper secured to a head or stock, and operated so as to reduce the material by a scraping or abrading action, the blades being sufficiently elastic to yield in passing over inequalities that would offer a resistance sufficient to endanger a machine employing rigid or unyielding blades.

Second, in the combination of a series of spring-blades or scrapers with a rotating head and radial arms, to the ends of which the said spring-blades are clamped.

Third, in pivoting the radial arms or blade-holders to the rotating head, so as to enable the blades to adjust themselves to the work, when the head is rotated in either direction, by the said arms inclining in either direction from a radial line, so as to cause the operative ends of the blades, when in contact with the stone, to incline backward from a perpendicular to the surface operated upon.

Fourth, in chamfering away the inner surfaces of the clamp or blade-holder at its outer end, contiguous to the blade, so as to enable the latter to spring or yield therein as it passes over inequalities in the surface of the stone.

In the accompanying drawing which represents my improved spring scrapers attached to a rotating head—

Figure I is a view in elevation.

Figure II is an enlarged sectional view of a portion of the head and one of the arms and scrapers, showing the mode of connecting the parts.

Figure III is a side view of one of the arms and blades, with a portion of the head in section.

Like letters of reference designate like parts in each of the figures.

A is a disk-shaped head or stock, designed to be attached to any suitable rotating shaft, *b*.

To it is pivoted any required number of the arms C, by means of the pivots *d*, on which they vibrate to the extent permitted by the stock-bolts *e e*, as shown most clearly by the red lines in Fig. II.

These bolts serve the double purpose of bearings, against which the arms rest, and of securing the annular rim F to the head A, which rim holds the arms firmly against lateral displacement.

Each arm is provided with a plate, *f*, secured to it by four bolts, *g g*, forming a clamp for holding the blade or scraper *h*, which consists of a plate of steel, preferably of uniform thickness, and of any required length.

This blade is held by a set-screw, *k*, passing centrally, or nearly so, through the bearing portion of the arm C, and pressing that portion of the blade against the clamping-jaw *f*.

The surfaces of the plate and arm contiguous to the blade are beveled away, as at *i i*, to allow it to spring under the pressure with which it is applied, and in passing over inequalities, as shown in red lines at *j*, Fig. II.

Keys, *l l*, are inserted in the holder at each side of the blade, of suitable thickness to regulate the bearings.

The blades are sharpened at their ends to conform to the molding or other ornament to be produced on the marble, being of steel sufficiently hard to remove, by scraping, a portion of the surface. When arranged in a head, as shown, and revolving in contact with the edge or other portion of a slab of marble, one blade follows the other in quick succession, each removing a small portion, but in the aggregate executing with a rapidity exceeding by five-fold that of manual labor, and without the risk of breakage, and the chipping which attends the use of the chisel, while the work is smoothly wrought, as it progresses, requiring only a slight polishing to finish it perfectly. Any number of arms and blades may be employed in the same head, limited only by the space on its periphery to attach them. Curved and serpentine moldings are as readily worked as straight ones, requiring only that the diameter of the circle described by the blades shall be adapted to the radius of the curve of the molding. The construction is such that the head may be revolved in either direction, and work with the same efficiency, as is shown by the diagram in red, in Fig. II, where the red and black arms indicate the position of the arm when running in opposite directions.

The yielding or elasticity of the blades, which is most conveniently obtained by forming them thin enough to spring slightly under the pressure applied, insures a steady and uniform feed to each, and the angle at which they are presented to the stone is such as to keep them self-sharpened, or nearly so, by the wear. The most effective position of the blades is one inclined slightly back of a radial line from the axis of the head. The blades may be of any suitable length, and each end may be formed of a different pattern, so that, by reversing, a differently formed molding will be wrought.

What is claimed as the invention of RALPH P. BAILEY, is—

1. A spring-blade or scraper, when attached to a head or stock, and applied to dressing or working stone, or other equivalent material, by scraping or abrading the surface thereof, substantially as hereinbefore set forth.

2. The combination of a series of spring-blades or scrapers, *h*, with the clamping-arms C, and head or stock A, for acting successively on the material to abrade it to the form of said blades, arranged and operating substantially as and for the purpose set forth.

3. The arm or holder C, when connected with the head A, or its equivalent, by means of pivot *d*, and the bearing-bolts *e e*, arranged to allow the blades to adjust themselves to the work when rotated in either direction, substantially as set forth.

4. The beveled inner faces *i i* of the clamp, arranged with the spring-scraper *h*, as and for the purpose hereinbefore set forth.

RALPH P. BAILEY.
PLATT D. BABBITT.

Witnesses:
JAY HYATT,
J. J. FARTHING.